(12) United States Patent
Schibsbye

(10) Patent No.: US 8,449,804 B2
(45) Date of Patent: May 28, 2013

(54) EVACUATION PROCESS FOR USE IN A METHOD FOR PRODUCING A COMPOSITE STRUCTURE

(75) Inventor: Karsten Schibsbye, Fredericia (DK)

(73) Assignee: LM Glasfiber A/S, Kolding (DK)

( * ) Notice: Subject to any disclaimer, the term of this patent is extended or adjusted under 35 U.S.C. 154(b) by 663 days.

(21) Appl. No.: 12/733,407

(22) PCT Filed: Aug. 21, 2008

(86) PCT No.: PCT/DK2008/000295
§ 371 (c)(1),
(2), (4) Date: Feb. 26, 2010

(87) PCT Pub. No.: WO2009/026918
PCT Pub. Date: Mar. 5, 2009

(65) Prior Publication Data
US 2010/0201045 A1    Aug. 12, 2010

(30) Foreign Application Priority Data

Aug. 31, 2007 (EP) .................................. 07388063

(51) Int. Cl.
*B27N 3/10* (2006.01)
(52) U.S. Cl.
USPC .......................................................... 264/257

(58) Field of Classification Search
USPC .......................................................... 264/257
See application file for complete search history.

(56) References Cited

U.S. PATENT DOCUMENTS

2002/0155186 A1 * 10/2002 Walsh ........................... 425/110

FOREIGN PATENT DOCUMENTS

| WO | WO 2006/058541 A1 | 6/2006 |
| WO | WO 2007/054101 A1 | 5/2007 |

\* cited by examiner

*Primary Examiner* — Yogendra Gupta
*Assistant Examiner* — John Robitaille
(74) *Attorney, Agent, or Firm* — Nath, Goldberg & Meyer; Jerald L. Meyer; Sanjana Mangalagiri

(57) ABSTRACT

The present invention relates to a method for producing a composite structure comprising fiber reinforced material by means of vacuum assisted resin transfer molding, where fiber material is impregnated with liquid resin. The method comprises an evacuation process of a mold cavity by initially providing an under-pressure in a part of the mold cavity in order to provide a first vacuum front having a first pressure gradient oriented towards a first side of the forming structure, and a second vacuum front with a second pressure gradient oriented towards a second side of the forming structure, and controlling the first vacuum front and the second front to move towards the first side and the second side of the forming structure, respectively.

13 Claims, 2 Drawing Sheets

US 8,449,804 B2

EVACUATION PROCESS FOR USE IN A METHOD FOR PRODUCING A COMPOSITE STRUCTURE

This is a National Phase Application filed under 35 U.S.C. 371 as a national stage of PCT/DK2008/000295, filed on Aug. 21, 2008 and claims benefit to European Patent Application No. 07388063.5, filed on Aug. 31, 2007, the entire content of which is hereby incorporated by reference in its entirety.

TECHNICAL FIELD

The present invention relates to a method for producing a composite structure comprising fibre reinforced material by means of vacuum assisted resin transfer moulding, where fibre material is impregnated with liquid resin, wherein the method comprises the steps of: a) providing a forming structure comprising a rigid mould part and a second mould part and having a longitudinal direction with a first end and a second end, and a transverse direction with a first side and a second side, b) placing the fibre material in the rigid mould part, c) sealing the second mould part against the rigid mould part to form a mould cavity, d) connecting a source of uncured fluid resin to at least one resin inlet communicating with the mould cavity, e) connecting at least one vacuum outlet communicating with the mould cavity, f) evacuating the interior of the forming structure through the at least one vacuum outlet, g) supplying uncured resin from the source of uncured resin to the mould cavity through the at least one resin inlet so as to fill the mould cavity with resin, and h) curing the resin in order to form the composite structure.

Thus the invention relates to a method for producing fibre composite structures by means of VARTM (vacuum assisted resin transfer moulding), where liquid polymer, also called resin, is filled into a mould cavity, in which fibre material priorly has been inserted, and where a vacuum is generated in the mould cavity, hereby drawing in the polymer. The polymer can be thermoset plastic or thermoplastics.

BACKGROUND

Vacuum infusion or VARTM is a process used for moulding fibre composite mouldings, where uniformly distributed fibres are layered in one of the mould parts, the fibres being rovings, i.e. bundles of fibre bands, bands of rovings, or mats, which are either felt mats made of individual fibres or woven mats made of fibre rovings. The second mould part is often made of a resilient vacuum bag, and is subsequently placed on top of the fibre material. By generating a vacuum, typically 80% to 95% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases, the polymer applied is polyester or epoxy, and the fibre reinforcement is most often based on glass fibres or carbon fibres.

During the process of filling the mould, a vacuum, which in this connection is to be understood as an under-pressure or negative pressure, is generated via vacuum outlets in the mould cavity, whereby liquid polymer is drawn into the mould cavity via the inlet channels in order to fill said mould cavity. From the inlet channels, the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Dry spots are thus areas where the fibre material is not impregnated, and where there can be air pockets, which are difficult or impossible to remove by controlling the vacuum pressure and possibly an overpressure at the inlet side. In connection with vacuum infusion, employing a rigid mould part and a resilient mould part in the form of a vacuum bag, the dry spots can be repaired after the process of filling the mould by for example puncturing the bag in the respective locations and by drawing out air for example by means of a syringe needle. Liquid polymer can optionally be injected in the respective locations, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which for instance can cause buckling effects.

Patent literature discloses examples of the use of a semi-permeable membrane, which increases the area in which the vacuum is active, and thus reduces the above problems. In this connection the term semi-permeable membrane means a membrane, which is permeable to gasses but impermeable to liquid polymer. Thus, if a semi-permeable membrane is placed across the fibre insertion, air pockets can be removed more easily or prevented entirely. Furthermore, it is known from WO 06/058541 to let some of the channels function sequentially as vacuum channels and inlet channels, thereby being able to control the flow fronts to a high degree and even being able to reverse the flow fronts to remove dry spots. The channels can thus first be used to evacuate the mould cavity by connecting them to a vacuum source and later be used as resin inlets by interrupting the connection to the vacuum source and connecting them to a polymer source.

Typically, the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become still bigger in the course of time, and may now be more than 60 meters long, the impregnation time in connection with manufacturing such blades has increased, as more fibre material has to be impregnated with polymer. Furthermore, the infusion process has become more complicated, as the impregnation of large shell members, such as blades, requires control of the flow fronts to avoid dry spots, which control may e.g. include a time-related control of inlet channels and vacuum channels. This increases the time required for drawing in or injecting polymer. As a result the polymer has to stay liquid for a longer time, normally also resulting in an increase in the curing time.

Furthermore, the VARTM method is encumbered with the problem that the vacuum during the evacuation process compresses the fibre layers, which therefore may wrinkle or bulge due to the vacuum level varying throughout the mould during the beginning of the evacuation process. Therefore, the composite structure, such as a wind turbine blade, may also contain wrinkles after impregnation and curing, which in turn can lead to reduced performance of the blade or result in local weak points, which may cause breakdown of the blade during use.

DISCLOSURE OF THE INVENTION

The object of the present invention is to provide a new and improved method of manufacturing a shell member of fibre composite material by means of vacuum infusion, where the formation of wrinkles are reduced or prevented entirely.

This is according to the invention achieved by the evacuation process of step f) being carried out by: f1) initially providing an under-pressure in a part of the mould cavity in order to provide a first vacuum front having a first pressure gradient oriented towards the first side of the forming structure, and a second vacuum front with a second pressure gradient oriented towards the second side of the forming structure, and f2) controlling the first vacuum front and the second vacuum front to move towards the first side and the second side of the forming structure, respectively.

Thereby, the fibre-reinforced material, which typically includes a number of fibre layers, is first compressed due to the under-pressure in an interior part of the forming structure. As the vacuum fronts move towards the sides of the forming structure, the fibre-reinforced material is gradually compressed along these vacuum fronts, thus providing an "ironing" effect, where the vacuum front pushes bulges or wrinkles in the fibre-reinforced material towards the sides of the forming structure. Thus, the number of wrinkles or bulges of the composite structure can be reduced significantly.

According to a preferred embodiment, the second mould part is a vacuum bag. This provides a particularly simple way of carrying out step c).

According to another preferred embodiment, the at least one vacuum outlet is provided as a number of vacuum channels comprising at least a central vacuum channel. The vacuum channels are connected to at least one vacuum source and communicate with the mould cavity, and they extend substantially in the longitudinal direction of the forming structure. This provides an advantageous embodiment for producing oblong composite structures, such as blades or blade parts for a wind turbine.

In one embodiment according to the invention, step f1) is carried out by applying a vacuum to the central vacuum channel. The vacuum fronts thereby move from a central line along the central vacuum channel and towards the first side and the second side of the forming structure. Thereby, the vacuum fronts have to propagate the shortest possible distance. However, the method can also be carried out by applying a vacuum to vacuum channels arranged at any other position between the first side and the second side, so that the vacuum channels extend in the longitudinal direction. This is especially the case when making complex composite structures, such as a shell part for a wind turbine blade, which is asymmetric.

In another embodiment according to the invention, the number of vacuum channels additionally comprises a number of additional vacuum channels, and step f1) is carried out by applying a first vacuum level to the central vacuum channel and applying a second vacuum level to a number of the additional vacuum channels, the first vacuum level being higher than the second vacuum level. That is, the pressure applied by the first vacuum channel is lower than the pressure applied by the second vacuum channels. For instance, the first vacuum level can be 90% of vacuum, whereas the second vacuum level can be 20% of vacuum. This provides an efficient evacuation of the entire forming structure, where vacuum fronts are still propagating from the central part of the forming structure towards the side due to the higher vacuum level provided by the central vacuum channel. The second vacuum level can also be 0% of vacuum, i.e. the atmospheric pressure, meaning that the vacuum is supplied only via the central vacuum channel.

According to an advantageous embodiment, the additional vacuum channels are arranged juxtaposed to the central vacuum channel. Preferably, the additional vacuum channels comprise a first vacuum channel extending in the longitudinal direction along the first side of the forming structure, and a second vacuum channel extending in the longitudinal direction along the second side of the forming structure. Thereby, the first vacuum channel can provide the first vacuum level, and the first and second vacuum channel can provide the second vacuum level.

According to yet another embodiment, the vacuum levels of individual vacuum channels are changed to a substantially identical vacuum level at the end of step f). That is, when an effective evacuation of the mould cavity has been achieved, the vacuum level of the individual vacuum channels can be increased to, for instance, the first vacuum level, so that all channels apply the same vacuum level during the following impregnation process of step g), thereby ensuring that the mould cavity remains evacuated during the impregnation process.

According to an advantageous embodiment, the vacuum channels are shaped as oblong hollow profile bodies having an interior, which communicates with the mould cavity through one or more slots extending in the longitudinal direction of the profile body. These can for instance be so called □-profiles or perforated tubes. According to another advantageous embodiment, the individual hollow profile bodies are covered by a semi-permeable membrane admitting air, but not admitting liquid resin. According to yet another advantageous embodiment, the semi-permeable membrane is only partially fixed to the individual profile bodies. Thereby, the vacuum channel can also be used as resin channel for supplying resin to the interior of the forming structure, where the partially fixed membrane opens when resin is supplied to the channels, and closes when a vacuum is applied to the channels.

In one embodiment according to the invention, the vacuum channels are placed against the vacuum bag. The vacuum channels can also be integrated in the vacuum bag. The channels can for instance be provided with a reinforcement, such as a helical member extending inside the channels, in order to prevent the channel from collapsing due to the vacuum.

In another embodiment according to the invention, a number of the vacuum channels are also connected to a source of uncured resin. Thus, the connection to the vacuum source can be interrupted, and the channels connected to the source of uncured resin. This can for instance be performed by switching the connection between the vacuum source and the polymer source via a switching or valve arrangement.

Thereby, step g) can be carried out by initially supplying resin via the central vacuum channel, while supplying vacuum via the additional vacuum channels, such that a first resin flow front and a second resin flow front are generated, these flow fronts being controlled such that they propagate from the central vacuum channel towards the first side and the second side of the forming structure, respectively.

The flow fronts can be controlled by the additional vacuum channels being arranged juxtaposed to the central vacuum channel, and the connection to the vacuum source of individual channels of the additional vacuum channels can be interrupted when either the first resin flow front or the second resin flow front reaches the individual channels, which are subsequently connected to the polymer source. That is, the juxtaposed vacuum channels are sequentially interrupted from the vacuum source and connected to the resin source as the flow fronts reach these channels. Thereby, it is possible to control the resin flow fronts with high precision so that they propagate from the centre of the forming part towards the first side and the second side without air pockets forming in the impregnated fibre material.

According to a preferred embodiment, the composite structure is an oblong shell member, such as a blade shell half for a wind turbine blade. According to an advantageous embodiment, the vacuum channels, or at least the central vacuum channel, extend substantially in the entire longitudinal length of the forming structure.

BRIEF DESCRIPTION OF THE DRAWINGS

The invention is explained in detail below with reference to an embodiment shown in the drawings, in which.

DETAILED DESCRIPTION OF THE INVENTION

Figure 1:
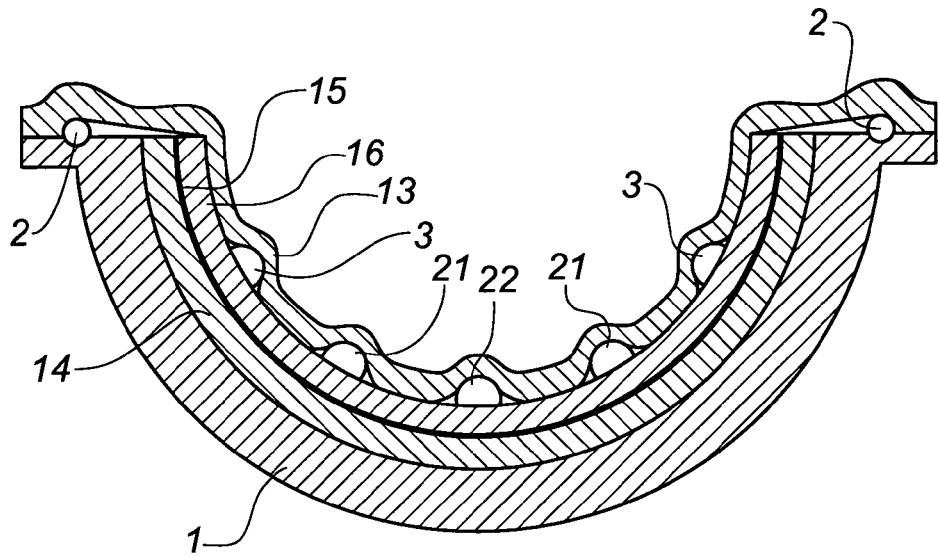
FIG. 1 shows a sectional view along line I-I in FIG. 2 through a mould for the production of a blade shell half.

FIG. 1 depicts a sectional view through a mould for the production of a blade shell half for a blade of a wind turbine by vacuum infusion and shows a solid mould part 1 with a top side mating to the exterior top side of the completed blade shell half. A fibre insertion 14 of for example glass fibre or carbon fibre is placed on the inner top side of the solid mould part 1. This layer can also be a sandwich structure comprising a core material, such as foamed polymer or balsa wood, covered by fibre layers, and can also comprise a longitudinally extending reinforcement section called a main laminate as described in for instance WO 06/058540 by the present applicant.

On top of the fibre insertion 14, a tear-off layer 15 or peel ply is placed which can be a net or a perforated film, and on top of the tear-off layer 15, a distribution net or a flow layer 16 is placed. On top of the distribution net/flow layer 16, a plurality of Ω-shaped inlet profile bodies 3, 21, 22 are placed, said bodies including a longitudinal slot facing the distribution net 16. On top of this, an air-tight vacuum bag 13 is placed. At the flanges of the mould, vacuum channels are provided in the form of perforated vacuum tubes 2.

According to conventional methods, the vacuum tubes 2 communicate with a vacuum source, and the inlet profile bodies 3, 21, 22 communicate with a polymer source with liquid polymer. The vacuum in the vacuum channels 2 generate a vacuum in a mould cavity formed between the solid mould part 1 and the vacuum bag 13, and thus polymer is drawn or sucked through the inlet profile bodies 3, 21, 22 downwards into the distribution net 16 and along said distribution net 16 through the tear-off layer 15, as it spreads and impregnates the fibre insertion 14. Upon the completion of curing the vacuum bag 13, the inlet profile bodies 3 and the distribution net 16 are removed by means of the tear-off layer 15.

According to the invention, the inlet profile bodies 3, 21, 22 and the vacuum channels 2 are not limited to the function described above, as during the process of filling the mould one or more of said inlet profile bodies 3, 21, 22 can communicate periodically with a vacuum source instead of with the polymer source, and the vacuum channels 2 can communicate with a polymer source instead of the vacuum source.

Figure 2:
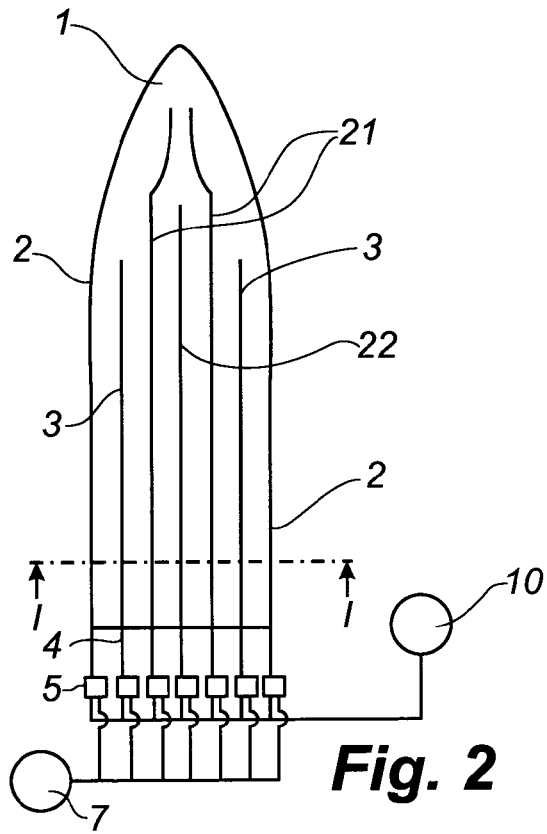
FIG. 2 shows a schematic view of an apparatus for carrying out the method according to the invention.

FIG. 2 shows a schematic view of an apparatus for carrying out the method according to the invention. The solid mould part 1 has an outline corresponding to the outline of a blade shell half. Each vacuum channel 2 and each inlet profile body 3, 21, 22 communicate via an inlet of the mould 4 with a valve member 5, which in turn communicates with both a polymer source 7 and a vacuum source 10.

Figure 3:
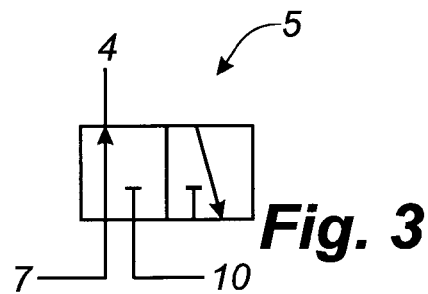
FIG. 3 shows a valve body included in the apparatus shown in FIG. 2.

FIG. 3 shows a schematic view of one of the valve members 5. As it can be seen, the valve member is a three-way valve member with two positions. In the position shown in FIG. 3, the inlet of the mould 4 communicates with the polymer source 7. If the valve member 5 is set into its second position, the inlet of the mould 4 is connected to the vacuum source 10. Of course, the valve member 5 can also be shaped as a valve with for example three positions, in the middle position blocking the polymer source 7 as well as the vacuum source 10. It goes without saying that other types of valve members can be applied as well, as it is essential that the inlet of the mould 4 can communicate with both a polymer source 7 and a vacuum source 10.

Figure 4:
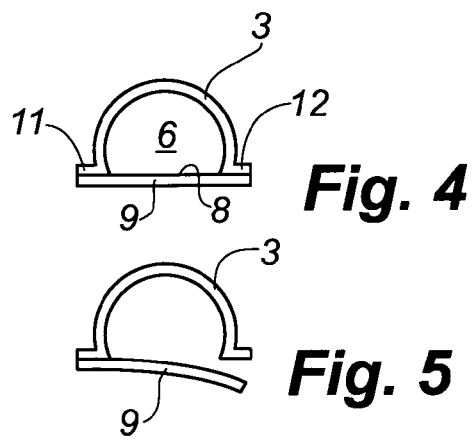
FIG. 4 shows a sectional view through an inlet profile body in a state where it communicates with a vacuum source.
Figure 5:
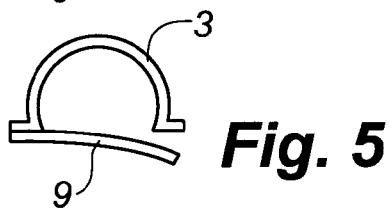
FIG. 5 shows a sectional view through the inlet profile body shown in FIG. 3 in a state where it communicates with a polymer source.

FIGS. 4 and 5 show a cross-section through an inlet profile body 3 according to a particular embodiment. In the cross-section, the inlet profile body 3 is Ω-shaped as it includes a cylindrical wall and two flap parts 11, 12. A slot 8, extending in the longitudinal direction of the profile body 3 between the two flap parts 11, 12, connects the interior 6 of the profile body 3 with the mould cavity. The slot 8 is covered by a semi-permeable membrane 9 extending from one flap part 11 to the second flap part 12. The membrane 9 is semi-permeable in the sense that it admits air but not liquid polymer. The membrane 9 is only secured to the profile body 3 at one end of the flap part 11 and it thus has the function of a flap valve or a flap check valve together with the profile body 3. When the inlet profile body 3 communicates with the vacuum source 10, the negative pressure draws in the membrane 9, so that it abuts the second flap part 12 and blocks the passage of liquid polymer. When the inlet profile body 3 communicates with the polymer source 7, the negative pressure in the mould cavity draws the semi-permeable membrane 9 away from the second flap part 12, as shown in FIG. 5, whereby liquid polymer can flow from the interior of the profile body 3 and into the mould cavity. If the membrane 9 cannot be moved inwards towards said mould cavity due to the fibre material in the mould cavity, and if a slight positive pressure is generated in the interior 6 of the inlet profile body, the profile body 3 lifts up the vacuum bag 13, thus allowing liquid polymer to flow into the mould cavity via the slot resulting between the flap part 12 of the profile body and the membrane 9. It should be noted that the membrane 9 is not necessary for the invention if the channels are not to be used as vacuum channels after having being used as inlet channels.

In the embodiment shown in FIG. 1, the inlet profile bodies 3, 21, 22 are shaped like Ω-formed profile bodies, and the vacuum channels 2 are shaped like perforated tubes. The inlet channels 3, 21, 22 can, however, also be shaped like perforated tubes just as the vacuum channels 2 can be shaped like Ω-formed profile bodies. If perforated tubes are applied, these can optionally be reinforced by a helical reinforcement member extending inside the tube and preventing the tube from folding up due to the vacuum.

Figure 6:
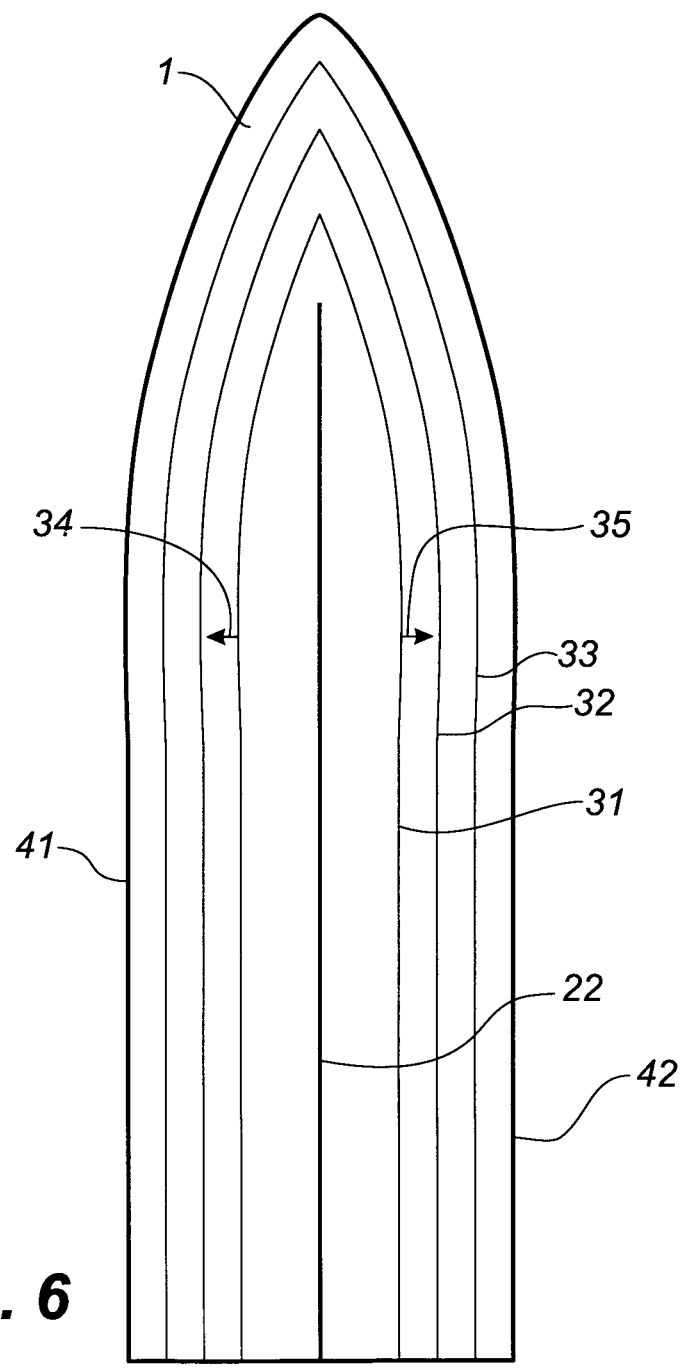
FIG. 6 shows a schematic view of the propagation of vacuum fronts during an evacuation process.

The method for producing the composite structure starts by evacuating the mould cavity, which is illustrated in FIG. 6. The evacuation process is carried out by letting the central inlet channel 22 be connected to the vacuum source 10 and applying a first vacuum level to this inlet channel 22, for instance 90% of vacuum. At the same time, a second pressure level is applied to the vacuum channels 2, which are arranged at a first side 41 and a second side 42 of the solid mould part 1, respectively. This second pressure level can for instance be 20% of vacuum. By applying a higher vacuum level (i.e. a lower pressure) to the central inlet channel 22, a high under-pressure is first generated at this inlet channel 22, thereby compressing the fibre insertion 14 in proximity of the inlet channel 22, which generates bulges or wrinkles at the sides thereof.

As this high vacuum level (i.e. a low pressure or a high negative pressure) is applied continuously to the central inlet channel 22, the under-pressure gradually spreads in the mould cavity. Consequently, a number of isobars 31, 32, 33 is generated, and these propagate towards the sides 41, 42 of the solid mould part 1. Thus, a first vacuum front having a first pressure gradient 34 oriented towards the first side 41 of the solid mould part 1 and a second vacuum front having a second pressure gradient 35 oriented towards the second side 42 of the solid mould part 1 are generated.

Thereby, the fibre insertion 14 is gradually compressed towards the sides 41, 42 of the solid mould part 1, and consequently the vacuum fronts "irons" or pushes the bulges or wrinkles towards the sides 41, 42 of the solid mould part 1. Thereby, the number of wrinkles in the finished composite structure can be reduced significantly.

When a predetermined level of vacuum is obtained in the mould cavity, the rest of the inlet channels 21, 3 can be connected to the vacuum source 10 in order to maintain a high vacuum level in the entire mould cavity.

The process of filling the mould cavity and impregnating the fibre insertion 14 with liquid resin can start with only the middle one of the inlet profile bodies 22 communicating with the polymer source, as the remaining juxtaposed inlet profile bodies 21, 3 and the vacuum channels 2 communicate with the vacuum source 10. Thus the inflowing resin spreads from the middle inlet profile body 22 towards the closest two inlet profile bodies 21. When flow fronts reach the latter, their connection to the vacuum source 10 are disrupted, and they are connected to the polymer source 7. Subsequently, the flow fronts move on towards the next inlet profile bodies 3 and so forth. Thus a pressure drop resulting from any possible unintentional perforation of the vacuum bag 13 and/or a strong air resistance either in the fibre insertion 14 pressed together due to the vacuum or in the distribution net does not prevent a powerful vacuum from being applied adjacent the flow front. A possible dry spot can also be removed again by connecting one of the inlet profile bodies with the vacuum source, thus reversing the flow direction of the polymer.

The central inlet channel 22 is here depicted as not extending along the entire mould part 1. However, the central inlet channel 22 typically extends along substantially the entire longitudinal length of the mould part 1. Also, the central inlet channel often comprises three or four separate channels, when a higher capacity for supplying resin is needed during the impregnation process.

The invention has been described with reference to a preferred embodiment. However, the scope of the invention is not limited to the illustrated embodiment, and alterations and modifications can be carried out without deviating from the scope of the invention. The mould part 1 is for instance depicted as having a boat shape. However, a wind turbine blade often has an asymmetric shape. Therefore, the central inlet channel 22 need not be centred along the entire longitudinal direction of the mould part 1.

LIST OF REFERENCE NUMERALS

1 Solid mould part
2 Vacuum channels
3 Inlet channels/vacuum channels
4 Inlet of the mould
5 Valve members
6 Interior of the inlet channels
7 Polymer source with liquid polymer
8 Slots
9 Semi-permeable membrane
10 Vacuum source
11 First flap of the inlet profile body
12 Second flap of the inlet profile body
13 Vacuum bag
14 Fibre insertion
15 Tear-off layer/peel ply
16 Distribution net
21 Inlet channels/vacuum channels
22 Inlet channel/vacuum channel
31, 32, 33 Isobars
34 First pressure gradient
35 Second pressure gradient
41 First side
42 Second side

The invention claimed is:

1. A method for producing a composite structure comprising fibre reinforced material by means of vacuum assisted resin transfer moulding, where fibre material is impregnated with liquid resin, the method comprising the steps of:
   a) providing a forming structure comprising a rigid mould part and a second mould part and having a longitudinal direction, and a transverse direction with a first side and a second side,
   b) placing the fibre material in the rigid mould part,
   c) sealing the second mould part against the rigid mould part to form a mould cavity,
   d) connecting a source of uncured fluid resin to at least one resin inlet communicating with the mould cavity,
   e) connecting at least one vacuum outlet communicating with the mould cavity,
   f) evacuating the interior of the forming structure through the at least one vacuum outlet,
      wherein the evacuation process is carried out by f1) initially providing an under-pressure in a part of the mould cavity in order to provide a first vacuum front having a first pressure gradient oriented towards the first side of the forming structure, and a second vacuum front with a second pressure gradient oriented towards the second side of the forming structure, and f2) controlling the first vacuum front and the second vacuum front to move towards the first side and the second side of the forming structure, respectively g) after completing step f), supplying uncured resin from the source of uncured resin to the mould cavity through the at least one resin inlet so as to fill the mould cavity with resin, and h) curing the resin in order to form the composite structure.

2. A method for producing a composite structure according to claim 1, wherein the second mould part is a vacuum bag.

3. A method for producing a composite structure according to claim 1, wherein the at least one vacuum outlet is provided as a number of vacuum channels comprising at least a central vacuum channel, the vacuum channels being connected to at least one vacuum source and communicating with the mould cavity, and wherein the vacuum channels extend substantially in the longitudinal direction of the forming structure.

4. A method for producing a composite structure according to claim 3, wherein step f1) is carried out by applying a vacuum to the central vacuum channel.

5. A method for producing a composite structure according to claim 4, wherein the number of vacuum channels additionally comprises a number of additional vacuum channels, and wherein step f1) is carried out by applying a first vacuum level to the central vacuum channel and applying a second vacuum level to a number of the additional vacuum channels, the first vacuum level being higher than the second vacuum level.

6. A method for producing a composite structure according to claim 5, wherein the additional vacuum channels are arranged juxtaposed to the central vacuum channel.

7. A method for producing a composite structure according to claim 6, wherein the additional vacuum channels comprise a first vacuum channel extending in the longitudinal direction along the first side of the forming structure, and a second vacuum channel extending in the longitudinal direction along the second side of the forming structure.

8. A method for producing a composite structure according to claim 3, wherein at the end of step f) the vacuum levels of individual vacuum channels are changed to a substantially identical vacuum level.

9. A method for producing a composite structure according to claim 3, wherein the vacuum channels are shaped as oblong hollow profile bodies having an interior, which communicates with the mould cavity through one or more slots extending in the longitudinal direction of the profile body.

10. A method for producing a composite structure according to claim 9, wherein the individual hollow profile bodies are covered by a semi-permeable membrane admitting air, but not admitting liquid resin.

11. A method for producing a composite structure according to claim 3, wherein a number of the vacuum channels are also connected to a source of uncured resin.

12. A method for producing a composite structure according to claim 11, wherein step g) is carried out by initially supplying resin via the central vacuum channel, while supplying vacuum via the additional vacuum channels, such that a first resin flow front and a second resin flow front are generated, these flow fronts being controlled such that they propagate from the central vacuum channel towards the first side and the second side of the forming structure, respectively.

13. A method for producing a composite structure according to claim 12, wherein the additional vacuum channels are arranged juxtaposed to the central vacuum channel, and wherein the connection to the vacuum source of individual channels of the additional vacuum channels is interrupted when either the first resin flow front or the second resin flow front reaches the individual channels, which are subsequently connected to the polymer course.

* * * * *